April 19, 1966   D. H. BAUMHART ETAL   3,247,435
ELECTRICAL SWITCH AND CIRCUIT
Filed Dec. 31, 1962   3 Sheets-Sheet 1
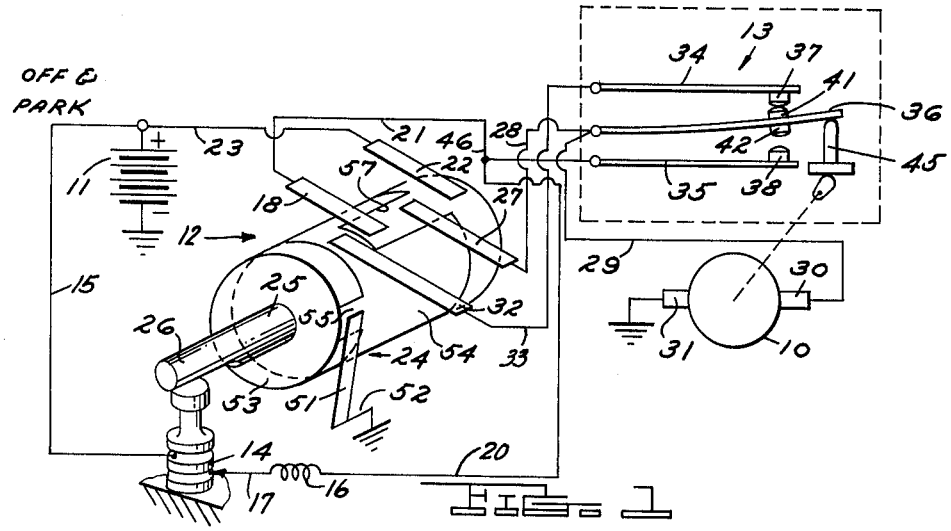
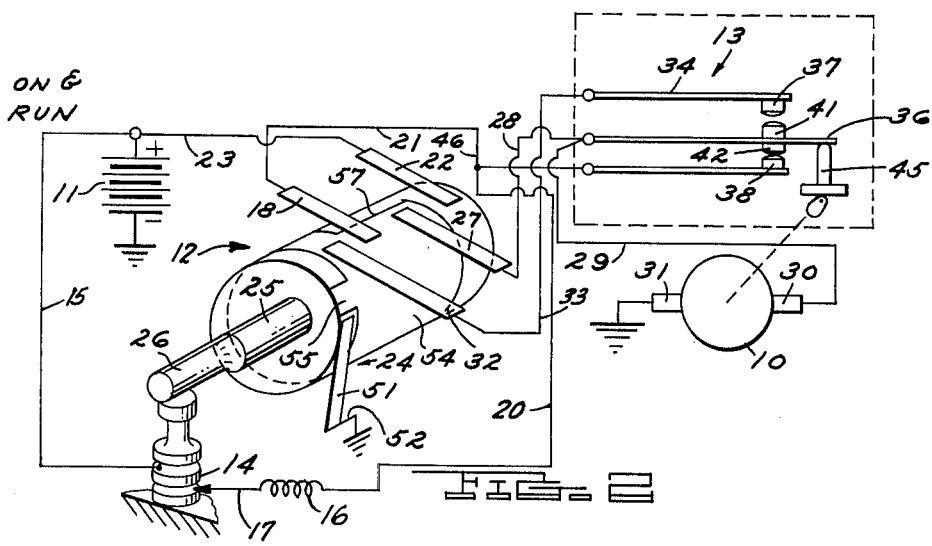
DONALD H. BAUMHART
HANS D. LANGE
INVENTORS
BY John R. Faulkner
Keith L. Zerschling
ATTORNEYS April 19, 1966     D. H. BAUMHART ETAL     3,247,435
ELECTRICAL SWITCH AND CIRCUIT
Filed Dec. 31, 1962     3 Sheets-Sheet 2
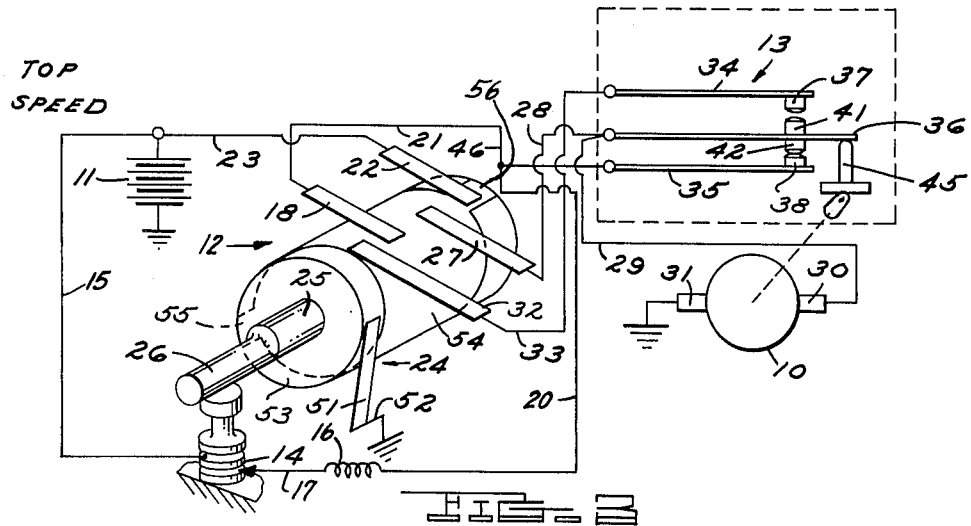
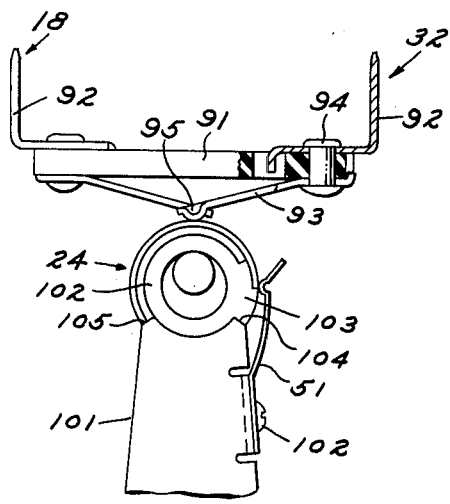
DONALD H. BAUMHART
HANS D. LANGE
INVENTORS
BY John R. Faulkner
Keith L. Zerschling
ATTORNEYS

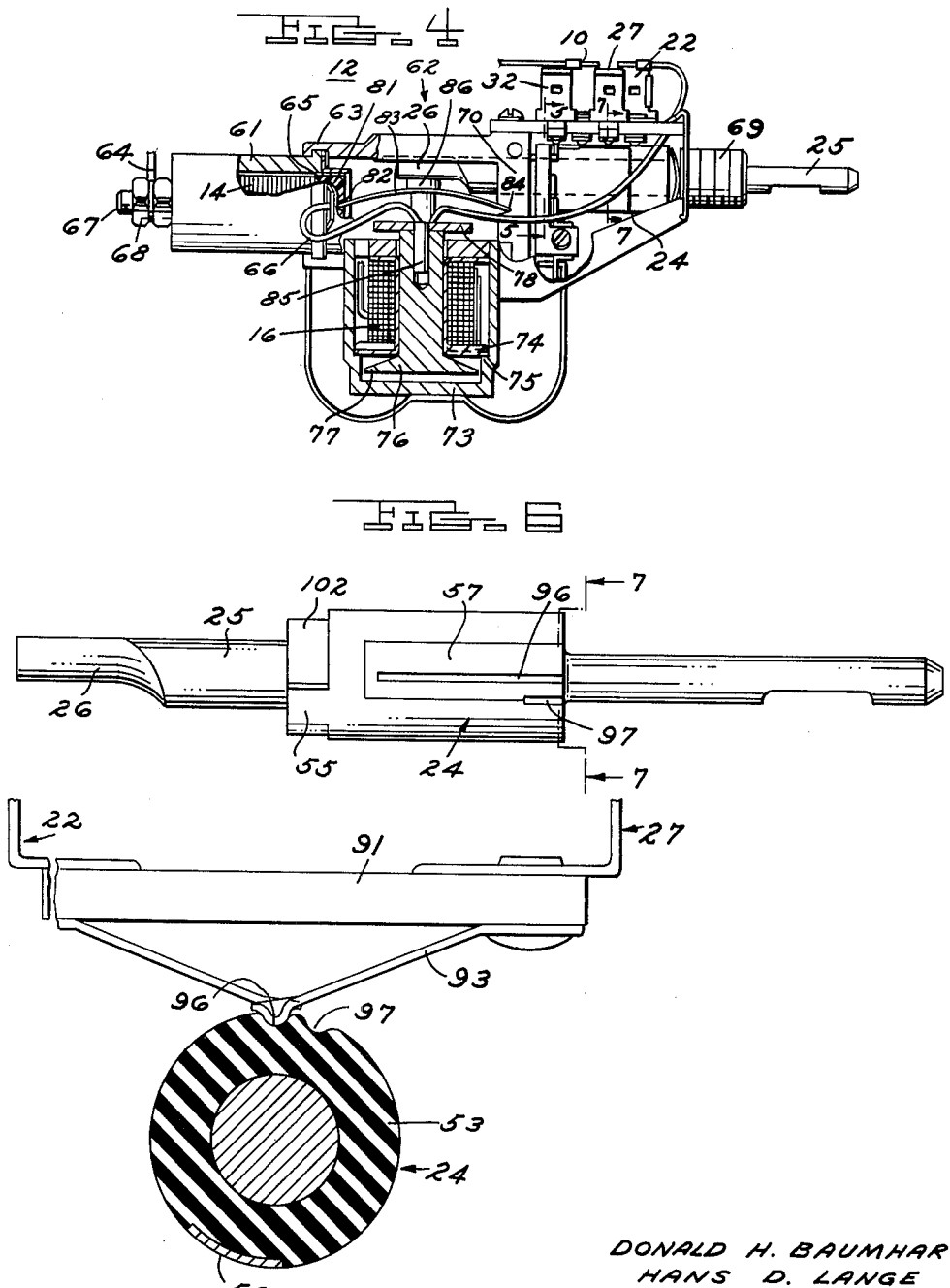

United States Patent Office 3,247,435
Patented Apr. 19, 1966

3,247,435
ELECTRICAL SWITCH AND CIRCUIT
Donald H. Baumhart, Livonia, and Hans D. Lange, Chelsea, Mich., assignors to Ford Motor Company, Dearborn, Mich., a corporation of Delaware
Filed Dec. 31, 1962, Ser. No. 248,369
2 Claims. (Cl. 318—332)

This invention relates to an integrated electrical switch mechanism and an electrical circuit that are employed with a carbon pile resistor for accomplishing variable speed control of an electric motor. The electric motor may be employed to drive a windshield wiper mechanism for an automotive vehicle.

In copending application S.N. 145,802, filed October 18, 1961, now Patent 3,086,238, issued April 23, 1963, in the name of Donald H. Baumhart and assigned to the assignee of this invention, there is disclosed an electric motor speed controller for controlling the speed of an electric motor. In that application it is explained that the invention disclosed therein is particularly useful in electric windshild wiper systems for automotive vehicles that employ electric motors having permanent magnet fields. The speed of the permanent magnet motor cannot be changed by varying the field excitation as is done normally with two-speed electric windshield wiper motors employing wound fields. A speed change can be accomplished, however, by connecting a resistor in series with the armature of the motor. This is satisfactory if the electric motor operates at a reasonably constant load, but if the load varies over a wide range the speed change may be too severe and the motor may stall.

In electric windshield wipers the load on the motor may change radically and it becomes particularly heavy when the windshield is in a damp-dry condition. In this condition, there is little water to lubricate the movement of the wiper blades across the windshield. With a fixed resistor in series with the armature of the electric motor, for purposes of two-speed operation, the current drawn by the motor may become so high as to cause the voltage drop across the resistor to be equal to the voltage of the energizing battery. In this case, the motor would stall.

In the invention disclosed in the above-mentioned application, a means is provided that is responsive to the current drawn by the armature for decreasing the resistance of the resistor positioned in series with the electric motor as an inverse function of the magnitude of the current drawn by the motor. Thus, the voltage drop across the resistor is maintained at a value below the terminal voltage of the battery so that the motor does not stall due to an increase in the current drawn during heavy load conditions. The means for accomplishing this preferably comprises a carbon pile resistor positioned in series with the armature of the windshield wiper motor. A solenoid is positioned in series with the carbon pile resistor and means actuated by the solenoid are employed to increase the force on the carbon pile thereby decreasing its resistance in response to an increase in the current drawn by the electric motor.

The present invention relates to an improvement and practical embodiment of an integrated switch mechanism for use with the invention described in the above-mentioned copending application. This integrated switch mechanism includes the carbon pile resistor and the solenoid. In addition, means are provided that will provide infinitely variable adjustment of the speed of an electric motor that may be employed to drive windshield wiper blades. This is accomplished by the use of a cam mounted on, or constructed as an integral part of, the switch actuating shaft. As the shaft is rotated the cam will vary the pressure applied to the carbon pile resistor and thus increase or decrease its resistance. This in turn varies the speed of the electric motor since this resistance is positioned in series with the armature of the motor. At any given setting of this shaft, the action described above, in relation to the solenoid varying the resistance of the carbon pile or other variable resistor as an inverse function of the current drawn by the electric motor, will take place.

The integrated switch mechanism of the invention in addition to providing the features described above, also provides a top speed setting in which the carbon pile resistor is bypassed so that the armature of the electric motor, that may be employed to drive windshield wiper blades, is energized directly from a source of direct current electrical energy.

An object of the invention is the provision of an integrated switch mechanism incorporated with a carbon pile resistor for variable control of an electric motor.

Another object of the invention is the provision of an integrated switch mechanism that will provide variable control for an electric motor employing a permanent magnet field.

Other objects and attendant advantages of the invention will become apparent as the specification is considered in connection with the attached drawings in which:

FIGURE 1 is a schematic view and circuit diagram of the electric switch mechanism and motor as it may be applied to an electric windshield wiper drive showing the circuit in the "off" or "park" position;

FIGURE 2 is a view similar to FIGURE 1, but showing the electric switch mechanism and circuit in the "on" or "run" position;

FIGURE 3 is a view similar to FIGURES 1 and 2, but showing the switch and the cicuit in the "top speed" position in which the carbon pile of the invention is bypassed;

FIGURE 4 is a side elevational view, partially in section, of the switch mechanism of the invention;

FIGURE 5 is a view taken along the lines 5—5 of FIGURE 4;

FIGURE 6 is a top plan view of the shaft, drum and cam mechanism employed in the switch shown in FIGURE 4; and FIGURE 7 is a sectional view taken along the lines 7—7 of FIGURE 4.

Referring now to FIGURE 1, there is shown an electric motor 10 that may be of the type that employs a permanent magnet field. The motor 10 is energized from a battery 11 through the integrated switch mechanism 12 of this invention. When the electric motor 10 is employed to drive an electric windshield wiper mechanism, the motor 10 is also adapted to be energized through a parking switch mechanism and circuit, generally designated by the numeral 13.

The electrical switch mechanism 12 includes a carbon pile resistor 14 connected to the battery 11 through a lead 15. The carbon pile resistor 14 is also connected to a solenoid 16 that controls the pressure on the carbon pile resistor and hence the resistance of it as an inverse function of the current flow through the solenoid. For example, an increased current through the solenoid will decrease the resistance of the carbon pile resistor 14. This variable action is indicated by the arrow 17. The solenoid 16 is connected to a first terminal 18 through leads 20 and 21. The battery 11 is also connected to a second terminal 22 through a lead 23.

The terminals 18 and 22 include means for contacting a drum 24 that is mounted on a switch shaft 25. These means will be explained more fully subsequently. This switch shaft 25 has a cam 26 at one end thereof that engages the carbon pile resistor 14 through suitable means and acts to vary the pressure on the carbon pile resistor as the shaft 25 is rotated.

The electric switch mechanism 12 also has a third terminal 27 that is connected through leads 28 and 29 to brush 30 of the electric motor 10. The other brush 31 of the electric motor 10 is grounded as shown. The electric switch mechanism 12 also has a fourth terminal 32 that is connected through a lead 33 to a stationary switch blade 34 of the parking switch 13. The parking switch mechanism 13 also includes a stationary switch blade 35 and a movable switch blade 36. The stationary switch blades 34 and 35 have contacts 37 and 38 respectively, while the movable switch blade 36 includes a contact 41 positioned on one side thereof and a contact 42 positioned on the other side thereof. The contacts 41 and 42 are adapted to engage the contacts 37 and 38 respectively.

A plunger 45 that is actuated once every revolution of the electric motor 10 acts upon the movable switch blade 36 to bring the contacts 41 and 37 into engagement momentarily once every revolution. These contacts 41 and 37 are positioned in engagement when the electric motor is in the "off" position and the electric windshield wiper blades driven thereby are in the "park" position. As stated, these contacts come into engagement momentarily once during every revolution of the electric motor 10, and this may be accomplished by use of a cam (not shown) located on the shaft of the electric motor which operates the plunger 45. The connection between the electric motor 10 and the plunger 45 has not been shown since it forms no part of the invention and is conventional in the art.

The solenoid 16 is also connected to the stationary switch blade 35 through the lead 20 and a lead 46. The electrical switch mechanism 12 also includes a fifth terminal 51 that is connected to ground through a lead 52.

The drum 24 is comprised of a cylindrical insulating member 53 that may be constructed from any suitable insulator, for example, Bakelite. The cylindrical insulating member 53 has a conductive sheath 54 having a predetermined configuration wrapped around its surface. The conductive sheath 54 may extend around the circumference of the insulating member 53, or it may extend only through the arc through which the shaft 25 is adaped to be turned. This may amount to approximately 190° in a commercial embodiment of the invention that will be described later in the specification. In either case, the conductive sheath 54 has an axially extending tongue 55 positioned at one end thereof and a second axially extending tongue 56 positioned at the other end thereof. These two tongues are separated circumferentially by approximately 190°. The tongue 56 may be seen by reference to FIGURE 3. The conductive sheath 54 also has an axially extending slot 57 located in an axial position adjacent the terminals 18 and 27 so that these terminals may directly contact the cylindrical insulating member 53 when the drum 24 and the shaft 25 are in the position shown in FIGURE 1.

The first axially extending tongue 55 is positioned to contact the terminal 51 when the drum 24 and the shaft 25 are in the position shown in FIGURE 1, while the axially extending tongue 56 is in a position to contact the terminal 22 when the drum 24 and the shaft 25 are in the position shown in FIGURE 3.

When the electric switch mechanism 12 is in the position shown in FIGURE 1, it can be seen that the electric motor 10 will not be energized since the terminals 18 and 22 that are connected to the battery 11 each contact the insulating member 53 of the drum 24. The contact 38 and the stationary switch blade 35 that are connected to the battery 11 do not energize the motor 10 since the contact 42 on the movable switch blade 36 has been moved out of contact with the contact 38 through the action of the plunger 45.

When the shaft 25 is rotated into the "on" or "run" position as shown in FIGURE 2, the terminal 18 that is energized from the battery 11 through the lead 15, the carbon pile resistor 14, the solenoid 16, and the leads 20 and 21, is placed in electrical contact with the terminal 27 through the conductive sheath 54. The electric motor 10 is then energized from the terminal 27 through lead 28, lead 29, and brush 30. This circuit effectively bypasses the parking switch mechanism 13.

As shown in FIGURES 1 and 2, the switch mechanism 12 is placed in the "on" or "run" position from the "off" or "park" position by the counterclockwise rotation of the shaft 25 and drum 24. It can be appreciated by an inspection of the cam 26 that further counterclockwise rotation of the shaft 25 about its center axis will cause the cam to exert higher pressure on the carbon pile resistor 14. The pressure applied increases in value to a maximum value when the mechanism is in the position shown in FIGURE 3. In the "on" or "run" position, as shown in FIGURE 2, therefore, the speed of the motor 10 is capable of infinitely variable adjustment since it may operate at any given speed within a given speed range by the proper positioning or rotation of the shaft 25 and cam 26. The greater the pressure on the carbon pile resistor 14, the less will be its resistance and the greater will be the speed of the electric motor 10 since the carbon pile resistor 14 is positioned in series with the armature of the motor.

In the top speed position shown in FIGURE 3, the terminal 27 is energized directly from the terminal 22 and hence directly from the battery 11 since the terminal 22 is connected to the battery 11 through the lead 23. In this position the axially extending tongue 56 of the conductive sheath 54 is in electrical contact with the terminal 22 and the electrical sheath 54 energizes the terminal 27 from the terminal 22. The terminal 27 is connected to the electrical motor 10 through the circuit previously described, including leads 28 and 29. In this position then, the electrical switch mechanism 12 effectively bypasses the carbon pile resistor 14 and the electric motor 10 runs at top speed.

When the system is employed to drive windshield wiper blades, the motor 10 will continue to be energized after the electric switch mechanism 12 has been returned to the "off" or "park" position as shown in FIGURE 1 until the plunger 45 disengages the contact 42 from the contact 38. An inspection of FIGURE 1 will show how this is accomplished. With the drum 24 and the shaft 25 in the position shown in FIGURE 1, contact will be broken between the terminals 18 and 27, but the motor will be energized from the battery 11, through lead 15, carbon pile resistor 14, solenoid 16, lead 20, lead 46, stationary switch blade 35, contact 38, contact 42, movable switch blade 36, lead 29, and brush 30. The motor will, therefore, continue to be energized until the plunger 45 moves the movable switch blade 36 into the position shown in FIGURE 1. This will coincide with the "park" position of the windshield wiper blades. At this time the motor 10 is de-energized and dynamic braking is afforded because both the brushes 30 and 31 are connected to ground. The brush 30 is connected to ground at this time through lead 29, movable switch blade 36, contact 41, contact 37, stationary switch blade 34, lead 33, terminal 32, conductive sheath 54 including axially extending tongue 55, terminal 51 and lead 52.

Referring now to FIGURES 5 through 7, the mechanical features of the electrical switch mechanism 12 of this invention are shown. In FIGURE 4 it can be seen that the carbon pile resistor 14 is enclosed in a cylindrical housing 61 that is constructed of an insulating material. The cylindrical housing 61 is affixed to the main metallic housing 62 of the electrical switch mechanism 12 by conventional means, for example, crimping, as shown at 63. The carbon pile resistor 14 is positioned against and is in electrical contact at one end with a terminal 64 while at the other end it is positioned against and is in electrical contact with a terminal 65. A lead 66 is connected to the terminal 65 and to the solenoid 16. An initial pressure adjustment may be made on the carbon pile resistor 14 by means of an adjusting bolt 67 and a lock nut 68. The switch shaft 25, the drum 24 and the cam 26 are rotatably mounted within the main metallic housing 62 by means of a bushing 69 and a structural member 70.

The solenoid 16 is supported within a depending metallic cup-shaped housing 73 by means of an insulator 74 that engages a shoulder 75 in the housing. An armature or plunger 76 extends through the solenoid 16 and the insulator 74, and it has an enlarged head 77 at one end and a plate 78 at the other. It can be seen that when the solenoid is energized the armature or plunger 76 will move downwardly as viewed in FIGURE 4.

It can readily be seen by an inspection of FIGURE 4 that the axis of the carbon pile resistor 14 is substantially perpendicular to the axes of the solenoid 16, the armature or plunger 76, and the cup-shaped housing 73.

The terminal 65 positioned at one end of the carbon resistor 14 has a button 81 of insulating material positioned against it. This button has a slot 82 positioned therein for the reception of one end of a bowed spring 83. The other end of the bowed spring 83 is positioned within a slot 84 in the main housing member 62. A pin 85 is affixed to the plunger or armature 76 and passes through a central aperture in the bowed spring 83. This pin has an enlarged head 86 that is in contact with the cam 26 positioned on the shaft 25.

As can be seen by reference to FIGURES 5 and 7, the terminals 18, 22, 27 and 32 are mounted on an insulator board 91. Each of the terminals 18, 22, 27 and 32 comprises an angular conductive member 92 and a laterally and downwardly extending resilient conductive finger 93. The angular member 92 and the resilient finger 93 are affixed to the terminal board 91 by a rivet 94. The angular member 92 of each of the terminals is adapted to be connected into the external circuitry as described in FIGURES 1 through 3.

The end of each of the fingers 93 remote from the rivet 94 has a protuberance 95, and certain of these protuberances 95 are adapted to engage a groove 96 positioned in insulating member 53 of the drum 24 at the position of the axially extending slot 57 in the conductive sheath 54.

The protuberances 95 on the resilient conductive fingers 93 of terminals 18, 22 and 27, engage this groove 96 when the switch mechanism is in the "off" position as shown in FIGURE 1. This provides a positive detent for the switch mechanism in the "off" position and holds it there until some predetermined force is applied to the switch shaft 25. A shorter groove 97 is positioned adjacent the groove 96 and it engages the protuberance 95 of resilient finger 93 of the terminal 22 when the shaft 25 is first turned to the "on" or "run" position. These two positions are detented in this manner to insure that the shaft 25 and drum 24 will be moved so that the protuberances 95 of resilient fingers 93 of terminals 18 and 27 come out of engagement with the insulating material 53 of the drum 24 and directly and completely into contact with the conductive sheath 54. This prevents arcing that could occur if the drum 24 were positioned so that the protuberance 95 on the resilient fingers 93 are positioned at the dividing line between the insulating material 53 and the conductive sheath 54.

The terminal 51 is affixed to a metal plate 100 as can be seen by reference to FIGURE 5. This metal plate serves as a ground for the terminal 51 as explained in relation to FIGURES 1 through 3. The terminal is affixed to the metal plate by a screw 101 and it comprises a metallic finger made of resilient conductive material.

The metal plate 100 engages a reduced section 102 of the drum 24, as can be seen by reference to FIGURE 5. This reduced portion 102 of the drum 24 has a radially extending stop member 103 that engages an abutment 104 of the metal plate 100 when the switch is in the "off" position. This is shown in FIGURE 5. When the switch is turned to the top speed position the other side of the stop member 103 will engage an abutment 105 on the metal plate 100. The detenting arrangement described above and the stop member 103 cooperating with abutments 104 and 105 on the metal plate 100 provide a positive and accurate limit to the movement of the switch and also provide a positive feel for the operator in determining the position of the switch.

It can be appreciated that the bowed spring 83 will exert little or no force on the carbon pile 14 when the solenoid 16 is not energized and when the cam member does not exert a force on the enlarged head 86 of the pin 85. When the switch is turned to the "on" position, however, the solenoid 16 will carry the load current of the armature. If this load current increases, the magnetic force of the solenoid 16 will increase thus moving the plunger and armature 76 downwardly and pulling the center of the bowed spring downwardly. This increases the force on the carbon pile resistor 14 and will result in a decrease in the resistance of the carbon pile 14 as an inverse function of the current flow through the armature of the motor 10. Additionally, rotation of the cam 26 through the movement of the shaft 25 from the slow speed position toward the higher or top speed position will move the center of the bowed spring 83 downwardly and thus increase the force on the carbon pile resistor 14. As a result, the resistance of the carbon pile 14 is decreased and more current will flow through the armature of the electric motor 10. This will cause an increase in speed. It can be seen, therefore, that rotation of the shaft 25 and the cam 26 will provide infinitely variable speed adjustment of the electric motor 10.

It can be appreciated that this invention provides a very compact and efficient integrated switch arrangement for use with an electric motor that is controlled by a carbon pile resistor positioned in an electric motor circuit.

It will be understood that the invention is not to be limited to the exact construction shown and described, but that various changes and modifications may be made without departing from the spirit and scope of the invention as defined in the appended claims.

We claim:

1. In a switch mechanism for controlling the energization of an electric motor from a source of electrical energy, the combination comprising a housing, a shaft rotatably mounted in said housing, a carbon pile resistor mounted in said housing with a longitudinal axis arranged substantially parallel to the longitudinal axis of said shaft, electric circuit means operated by the turning of said shaft and adapted to connect the electric motor to said source of electrical energy through said carbon pile resistor, a solenoid positioned substantially perpendicularly to said carbon pile resistor and having an armature, a bowed spring having one end positioned against one end of said carbon pile resistor and having the other end engaging said frame, said armature engaging the central portion of said bowed spring, said solenoid being connected in series with said carbon pile and adapted to be connected in series with the electric motor, a cam positioned on the end of said shaft, said cam engaging said armature whereby force on the center of said bowed spring and on said carbon pile is varied as said shaft is rotated and is adapted to be varied in accordance with the current drawn by said motor.

2. In a switch mechanism for controlling the energization of an electric motor from a source of electrical energy the combination comprising a housing, a shaft rotatably supported in said housing, a carbon pile resistor positioned within said housing, switch means operated by rotation of said shaft and adapted to connect the electric motor to said source of electrical energy through said carbon pile, said switch means having an "off" position and a "full on" position, a cam positioned at the end of said shaft, means engaging said cam and said carbon pile for increasing the pressure upon said carbon pile when said shaft is rotated from the "off" position toward said "full on" position whereby the resistance of said carbon pile resistor is reduced as said shaft is rotated from the "off" position toward the "full on" position, a solenoid positioned within the frame of said switch, said solenoid adapted to be connected in series with said motor and said carbon pile resistor, an armature associated with said solenoid, and means interconnecting said armature and said carbon pile resistor for varying the pressure on said carbon pile resistor as current flow through said solenoid varies.

References Cited by the Examiner

UNITED STATES PATENTS

| | | | |
|---|---|---|---|
| 1,089,081 | 3/1914 | Ray | 338—110 |
| 2,454,671 | 11/1948 | Roberts | 318—349 |
| 3,086,238 | 4/1963 | Baumhart | 318—349 X |

MILTON O. HIRSHFIELD, *Primary Examiner.*

ORIS L. RADER, *Examiner.*

S. GORDON, *Assistant Examiner.*